United States Patent
Chang et al.

(10) Patent No.: US 11,086,443 B1
(45) Date of Patent: Aug. 10, 2021

(54) TOUCH APPARATUS, TOUCH DRIVING DEVICE AND OPERATION METHOD THEREOF

(71) Applicant: HIMAX TECHNOLOGIES LIMITED, Tainan (TW)

(72) Inventors: Yaw-Guang Chang, Tainan (TW); En-Tse Cun, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/845,033

(22) Filed: Apr. 9, 2020

(51) Int. Cl.
*G06F 3/041* (2006.01)

(52) U.S. Cl.
CPC .......... *G06F 3/0416* (2013.01); *G06F 3/0412* (2013.01)

(58) Field of Classification Search
CPC ....... G06F 3/041–0448; G06F 3/04164; G06F 3/044; G06F 3/0416; G06F 3/041661; G06F 3/0446; G06F 3/0412; G06F 2203/04106; G06F 2203/04101; G06F 2203/04104; G06F 2203/04108; G06F 2203/04112; G02F 1/13338; G02F 2201/121
See application file for complete search history.

(56) References Cited

U.S. PATENT DOCUMENTS

| | | | |
|---|---|---|---|
| 9,740,349 B2* | 8/2017 | He | G06F 3/044 |
| 10,067,603 B1* | 9/2018 | Hsieh | G06F 3/041661 |
| 10,684,724 B1* | 6/2020 | Chang | G06F 3/04166 |
| 2017/0102798 A1* | 4/2017 | Qiao | G06F 3/0442 |
| 2018/0188868 A1* | 7/2018 | Park | G06F 3/0412 |
| 2019/0079636 A1* | 3/2019 | Lee | G06F 3/0412 |
| 2019/0171319 A1* | 6/2019 | Aoki | G06F 3/0412 |
| 2020/0167040 A1* | 5/2020 | Shepelev | G06F 3/0412 |

* cited by examiner

*Primary Examiner* — Sanjiv D. Patel
(74) *Attorney, Agent, or Firm* — JCIPRNET

(57) ABSTRACT

A touch apparatus, a touch driving device and an operation method are provided. The touch driving device includes a first routing circuit, a second routing circuit, and a processing circuit. The first routing circuit connects a first current electrode of first sensing electrodes to a first common terminal of the first routing circuit. The second routing circuit connects a second current electrode of second sensing electrodes to a second common terminal of the second routing circuit. The same input terminal of the processing circuit is coupled to the first common terminal and the second common terminal. In the case where a touch sensing result corresponding to the input terminal indicates that a touch event has occurred, the processing circuit checks whether the touch event also occurs on an adjacent sensing electrode adjacent to the first current electrode to determine whether the touch event occurs on the first current electrode.

21 Claims, 3 Drawing Sheets

FIG. 3

TOUCH APPARATUS, TOUCH DRIVING DEVICE AND OPERATION METHOD THEREOF

BACKGROUND

Field of the Disclosure

The disclosure relates to an electronic apparatus, and more particularly to a touch apparatus, a touch driving device and an operation method thereof.

Description of Related Art

In general, touch panels have multiple sensing electrodes. These sensing electrodes are utilized to sense touch events. Analog-to-digital converter (ADC) of the processing circuit is utilized to convert the sensing signals of these sensing electrodes into digital data. In order to reduce the cost of the circuit, typical processing circuit utilizes a smaller number of ADCs to process a larger number of sensing electrodes by means of time-division multiplexing (TDM). For example, if the touch panel has 192 sensing electrodes and the processing circuit has 8 ADCs, then the 8 ADCs need to perform 24 times of reading operations (converting operation) to convert the sensing signals of the 192 sensing electrodes into digital data. In other words, it takes 24 units of time for the 8 ADCs to convert the sensing signals of the 192 sensing electrodes into digital data. If the touch panel has 192 sensing electrodes and the processing circuit has only one ADC, then it takes 192 units of time for the ADC to convert the sensing signals of the 192 sensing electrodes into digital data. Reducing the number of ADC means that the processing time of the processing circuit will be increased.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE DISCLOSURE

The disclosure provides a touch apparatus, a touch driving device and an operation method thereof, which can reduce the frequency of reading operation on a touch panel in the case where the number of analog-to-digital converters (ADCs) is limited (or reduce the number of ADCs in the case where the frequency of reading operation on touch panel is limited).

In an embodiment of the disclosure, the touch driving device is adapted to drive a touch panel. The touch driving device includes a first routing circuit, a second routing circuit and a processing circuit. A plurality of first selection terminals of the first routing circuit are adapted to be coupled to a plurality of first sensing electrodes in a first sub-region of the touch panel. The first routing circuit is configured to select one of the first sensing electrodes in a first order as a first current electrode, and to selectively connect the first current electrode to a first common terminal of the first routing circuit. A plurality of second selection terminals of the second routing circuit are adapted to be coupled to a plurality of second sensing electrodes in a second sub-region of the touch panel. The second routing circuit is configured to select one of these second sensing electrodes in a second order (different from the first order) as a second current electrode, and to selectively connect the second current electrode to a second common terminal of the second routing circuit. Specifically, the second common terminal is coupled to the first common terminal. The first input terminal of the processing circuit is coupled to the first common terminal and the second common terminal. The first ADC of the processing circuit converts a first touch sensing result corresponding to the first input terminal into first touch sensing data. In the case where the first touch sensing data indicates that a touch event has occurred, the processing circuit checks whether the touch event also occurs on at least one first adjacent sensing electrode of the first sensing electrodes adjacent to the first current electrode in the space to determine whether the touch event occurs on the first current electrode.

In an embodiment of the disclosure, the above-mentioned operation method includes: selecting, by the first routing circuit in the first order, one of the plurality of first sensing electrodes in the first sub-region of the touch panel as the first current electrode, and selectively connecting the first current electrode to the first common terminal of the first routing circuit; selecting, by the second routing circuit in the second order (different from the first order), one of the plurality of second sensing electrodes in the second sub-region of the touch panel as the second current electrode, and selectively connecting the second current electrode to the second common terminal of the second routing circuit, wherein the second common terminal and the first common terminal are commonly coupled to the first input terminal of the processing circuit; converting, by the first ADC of the processing circuit, the first touch sensing result corresponding to the first input terminal into the first touch sensing data; and in the case where the first touch sensing data indicates that a touch event has occurred, checking, by the processing circuit, whether the touch event also occurs on at least one first adjacent sensing electrode of the first sensing electrodes adjacent to the first current electrode in the space to determine whether the touch event also occurs on the first current electrode.

In an embodiment of the disclosure, the touch apparatus includes a touch panel, a first routing circuit, a second routing circuit, and a processing circuit. The plurality of first selection terminals of the first routing circuit are coupled to the plurality of first sensing electrodes of the first sub-region of the touch panel. The first routing circuit is configured to select one of the first sensing electrodes in the first order as the first current electrode, and to selectively connect the first current electrode to the first common terminal of the first routing circuit. The plurality of second selection terminals of the second routing circuit are coupled to the plurality of second sensing electrodes in the second sub-region of the touch panel. The second routing circuit is configured to select one of the second sensing electrodes in the second order (different from the first order) as the second current electrode, and to selectively connect the second current electrode to the second common terminal of the second routing circuit. Specifically, the second common terminal is coupled to the first common terminal. The first input terminal of the processing circuit is coupled to the first common terminal and the second common terminal. The first ADC of the processing circuit converts the first touch sensing result corresponding to the first input terminal into the first touch sensing data. In the case where the first touch sensing data indicates that a touch event has occurred, the processing circuit checks whether the touch event also occurs on at least one first adjacent sensing electrode of the first sensing electrodes adjacent to the first current electrode in the space to determine whether the touch event also occurs on the first current electrode.

Based on the above, the touch apparatus, the touch driving device and the operation method thereof described in the embodiments of the disclosure can divide the touch panel into multiple sub-regions, such as a first sub-region and a second sub-region. In a reading operation performed by the processing circuit on the touch panel, the first routing circuit selects a sensing electrode (first current electrode) from the first sub-region in the first order, and the second routing circuit selects a sensing electrode (second current electrode) from the second sub-region in the second order (different from the first order). The first routing circuit and the second routing circuit make the first current electrode and the second current electrode to be short-circuited (electrically connected) with each other. In the meantime (in a reading operation performed by the processing circuit on the touch panel), the same ADC in the processing circuit can obtain (read) the first touch sensing result corresponding to the first current electrode and the second current electrode through the first routing circuit and the second routing circuit. Therefore, in the case where the number of ADCs is limited, the touch driving device can reduce the frequency of reading operation on the touch panel (or reduce the number of ADCs in the case where the frequency of reading operation on the touch panel is limited).

In order to make the above features and advantages of the present disclosure more comprehensible, embodiments are described below in detail with the accompanying drawings as follows.

BRIEF DESCRIPTION OF THE DRAWINGS

FIG. 3 is a schematic view illustrating the layout of a sensing electrode array of the touch panel shown in FIG. 1 according to an embodiment of the present disclosure.

DESCRIPTION OF EMBODIMENTS

Figure 1:
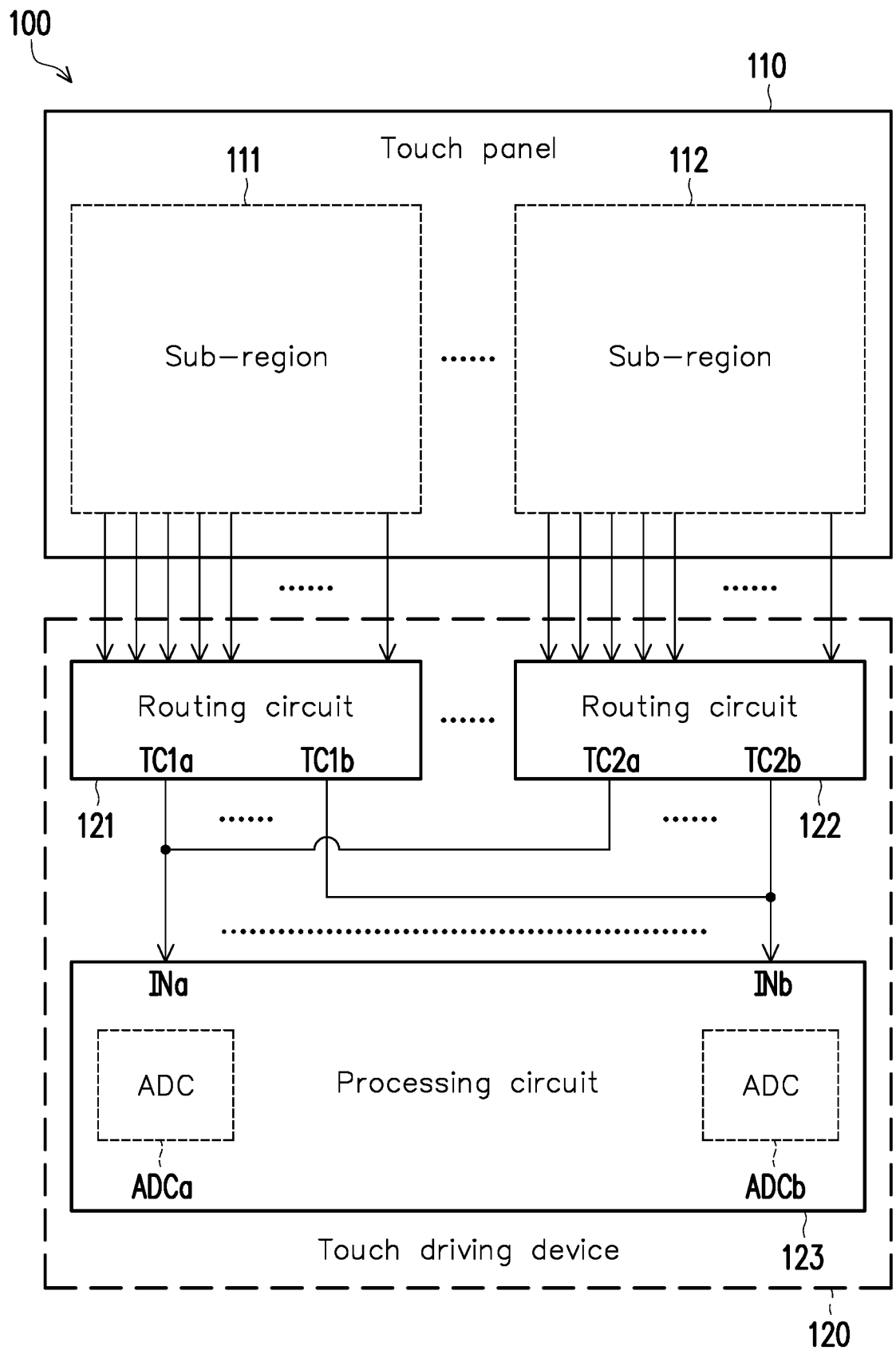
FIG. 1 is a schematic circuit block view of a touch apparatus according to an embodiment of the present disclosure.

The term "coupling/coupled" used in this specification (including claims) may refer to any direct or indirect connection means. For example, "a first device is coupled to a second device" should be interpreted as "the first device is directly connected to the second device" or "the first device is indirectly connected to the second device through other devices or connection means." The terms "first" and "second" mentioned in the full text of the specification (including the claims) are used to name the elements, or for distinguishing different embodiments or scopes, instead of restricting the upper limit or the lower limit of the numbers of the elements, nor limiting the order of the elements. Moreover, wherever possible, components/members/steps using the same referral numerals in the drawings and description refer to the same or like parts. Components/members/steps using the same referral numerals or using the same terms in different embodiments may cross-refer related descriptions.

FIG. 1 is a schematic circuit block view of a touch apparatus 100 according to an embodiment of the present disclosure. The touch apparatus 100 shown in FIG. 1 includes a touch panel 110 and a touch driving device 120. The touch panel 110 has a plurality of sensing electrodes (that is, a sensing electrode array), and the sensing electrodes can be divided into a plurality of sub-regions according to requirement of design, such as the sub-region 111 and the sub-region 112 shown in FIG. 1. It should be noted that the number of the plurality of sub-regions may be determined according to requirement of design, and the number of sensing electrodes in any one of the plurality of sub-regions may also be determined according to requirement of design. In addition, the geometric shape of the plurality of sub-regions can also be determined according to requirement of design.

The embodiment provides no limitation to the implementation and details of the touch panel 110. For example, in some embodiments, the touch panel 110 may be an in-cell touch display panel or other touch panels. Specifically, in some embodiments, a common voltage electrode of an in-cell touch display panel can be divided into a plurality of sub-electrodes, and the sub-electrodes can be utilized as the sensing electrodes of the sub-region 111 and the sub-region 112.

The touch driving device 120 is adapted to drive the touch panel 110. In the embodiment shown in FIG. 1, the touch driving device 120 includes a plurality of routing circuits, such as the routing circuit 121 and the routing circuit 122 shown in FIG. 1. The routing circuit 121 has a plurality of selection terminals, and the selection terminals are adapted to be coupled to a plurality of sensing electrodes in the sub-region 111 of the touch panel 110. The routing circuit 121 has at least one common terminal, such as the common terminal TC1$a$ and the common terminal TC1$b$ shown in FIG. 1. The number of the at least one common terminal of the routing circuit 121 may be determined according to requirement of design. The routing circuit 122 has a plurality of selection terminals, and the selection terminals are adapted to be coupled to the plurality of sensing electrodes in the sub-region 112 of the touch panel 110. The routing circuit 122 has at least one common terminal, such as the common terminal TC2$a$ and the common terminal TC2$b$ shown in FIG. 1. The number of the at least one common terminal of the routing circuit 122 may be determined according to requirement of design. The at least one common terminal of the routing circuit 122 is coupled to the at least one common terminal of the routing circuit 121 in a one-to-one manner. For example, the common terminal TC2$a$ is coupled to the common terminal TC1$a$, and the common terminal TC2$b$ is coupled to the common terminal TC1$b$.

In the embodiment shown in FIG. 1, the touch driving device 120 further includes a processing circuit 123. The processing circuit 123 has at least one input terminal, such as the input terminal INa and the input terminal INb shown in FIG. 1. The number of the at least one input terminal of the processing circuit 123 may be determined according to requirement of design. The at least one input terminal of the processing circuit 123 is coupled to the at least one common terminal of the routing circuit 121 (or the routing circuit 122) in a one-to-one manner. For example, the input terminal INa of the processing circuit 123 is coupled to the common terminal TC1$a$ of the routing circuit 121 and the common terminal TC2$a$ of the routing circuit 122, and the input terminal INb of the processing circuit 123 is coupled to the common terminal TC1$b$ of the routing circuit 121 and the common terminal TC2$b$ of the routing circuit 122.

Figure 2:
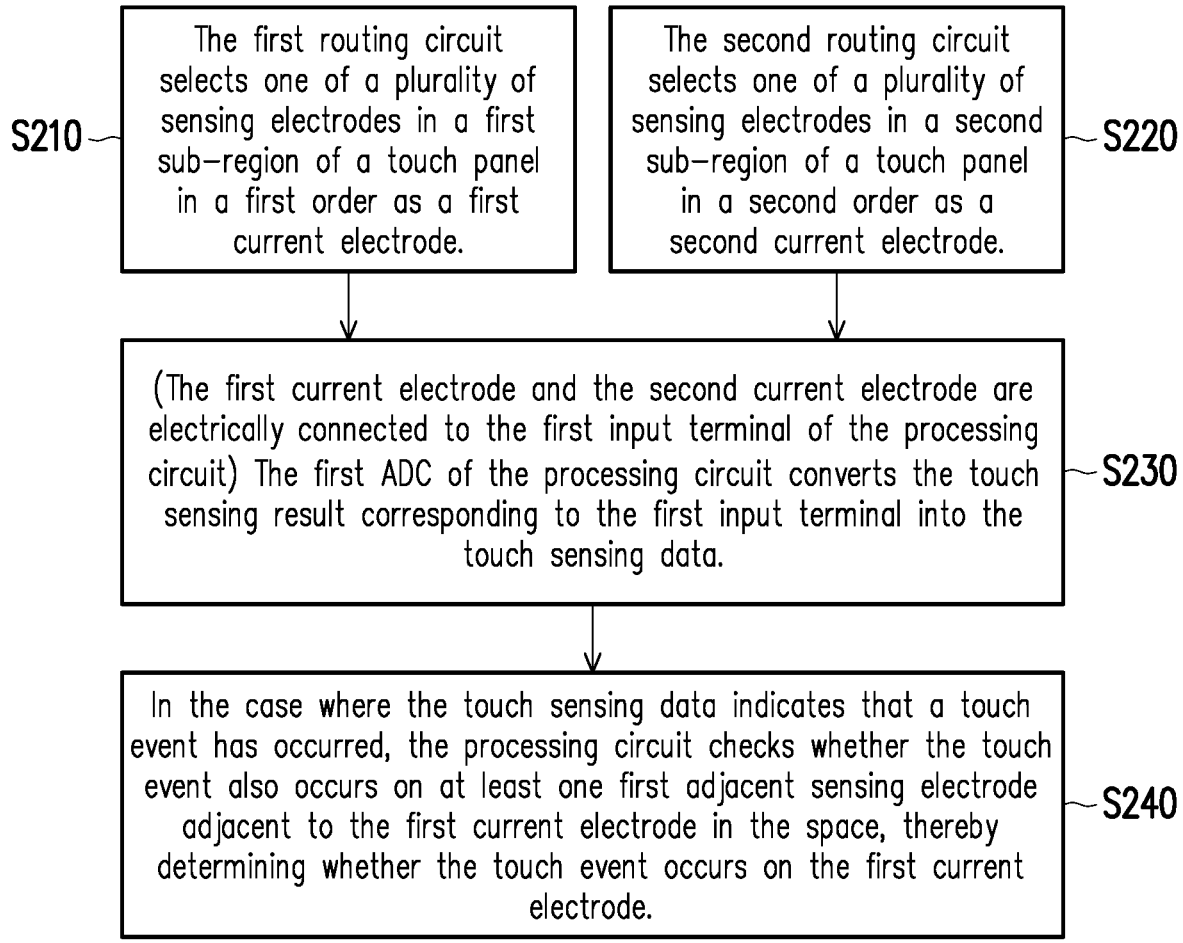
FIG. 2 is a flowchart illustrating an operation method of a touch driving device according to an embodiment of the present disclosure.

FIG. 2 is a flowchart illustrating an operation method of a touch driving device 120 according to an embodiment of the present disclosure. Please refer to FIG. 1 and FIG. 2. The routing circuit 121 is configured to select one of the sensing electrodes in the sub-region 111 in a first order as the first current electrode, and to selectively connect the first current electrode to the common terminal TC1a of the routing circuit 121 (step S210). The first order can be determined according to requirement of design. The routing circuit 122 is configured to select one of the sensing electrodes in the sub-region 112 in a second order (different from the first order) as the second current electrode, and to selectively connect the second current electrode to the common terminal TC2a of the routing circuit 122 (step S220). The second order can be determined according to requirement of design.

Steps S210 and S220 can be performed in the same time interval. For example, steps S210 and S220 may be performed in a cycle where an ADC of the processing circuit 123 performs a reading operation (converting operation). In some embodiments, step S210 and step S220 may be performed simultaneously.

In the case where the routing circuit 121 has a plurality of common terminals, the routing circuit 121 selects another one (or other) of the sensing electrodes in the sub-region 111 in the first order, and then selectively connect said another (or other) sensing electrode to other common terminals of the routing circuit 121 in a one-to-one manner. For example, the routing circuit 121 selects another one of the sensing electrodes in the sub-region 111 in the first order as the third current electrode, and selectively connects the third current electrode to the common terminal TC1b of the routing circuit 121.

In the case where the routing circuit 122 has a plurality of common terminals, the routing circuit 122 selects another one (or other) of the sensing electrodes in the sub-region 112 in the second order, and then selectively connect said another (or other) sensing electrode to other common terminals of the routing circuit 122 in a one-to-one manner. For example, the routing circuit 122 selects another one of the sensing electrodes in the sub-region 112 in the second order as the fourth current electrode, and selectively connects the fourth current electrode to the common terminal TC2b of the routing circuit 122.

In the embodiment shown in FIG. 1, the processing circuit 123 includes at least one ADC, such as the ADC ADCa and ADC ADCb shown in FIG. 1. It should be noted that the number of the at least one ADC can be determined according to requirement of design. In general, the number of the at least one ADC may be less than the number of the sensing electrodes of the touch panel 110.

The analog front end (AFE) circuit (not shown in FIG. 1) of the processing circuit 123 can provide a touch sensing result corresponding to the input terminal INa to the ADC ADCa of the processing circuit 123. The ADC ADCa can convert the touch sensing result corresponding to the input terminal INa into the first touch sensing data (step S230). In the case where the processing circuit 123 has a plurality of ADCs, the AFE circuit may provide touch sensing results corresponding to other input terminals of the processing circuit 123 to other ADCs of the processing circuit 123. For example, the AFE circuit may also provide a touch sensing result corresponding to the input terminal INb to the ADC ADCb of the processing circuit 123, and then the ADC ADCb can convert the touch sensing result corresponding to the input terminal INb into the second touch sensing data. Please refer to descriptions related to the input terminal INa, the ADC ADCa and the first touch sensing data for details regarding the input terminal INb, the ADC ADCb and the second touch sensing data, no further details will be incorporated herein.

The processing circuit 123 may check the first touch sensing data of the ADC ADCa to determine whether a touch event occurs on the first current electrode selected by the routing circuit 121 or the second current electrode selected by the routing circuit 122. In the case where the first touch sensing data indicates that the touch event has occurred, the processing circuit 123 may check whether the touch event also occurs on at least one first adjacent sensing electrode of the first sensing electrodes in the sub-region 111 adjacent to the first current electrode in the space, thereby determining whether the touch event occurs on the first current electrode (step S240). Or in other embodiments, the processing circuit 123 may check whether the touch event also occurs on at least one second adjacent sensing electrode of the second sensing electrodes in the sub-region 112 adjacent to the second current electrode in the space, thereby determining whether the touch event occurs on the second current electrode (step S240).

For example, in the case where the first touch sensing data of the ADC ADCa indicates that the touch event has occurred, and in the case where the touch event also occurs on the at least one first adjacent sensing electrode, the processing circuit 123 may determine that the touch event occurs on the first current electrode selected by the routing circuit 121. Conversely, in the case where the first touch sensing data of the ADC ADCa indicates that the touch event has occurred, and in the case where the touch event does not occur on the at least one first adjacent sensing electrode, the processing circuit 123 may determine that the touch event does not occur on the first current electrode selected by the routing circuit 121. In addition, in the case where the first touch sensing data of the ADC ADCa indicates that the touch event has occurred, and in the case where it is determined that the touch event does not occur on the first current electrode selected by the routing circuit 121, the processing circuit 123 may determine that the touch event occurs on the second current electrode selected by the routing circuit 122.

In other embodiments, in the case where the first touch sensing data of the ADC ADCa indicates that the touch event has occurred, the processing circuit 123 not only checks the first current electrode selected by the routing circuit 121 and the sensing electrode adjacent thereto, but also can check whether the touch event also occurs on at least one second adjacent sensing electrode of the second sensing electrodes in the sub-region 112 adjacent to the second current electrode selected by the routing circuit 122 in the space, thereby determining whether the touch event occurs on the second current electrode. For example, in the case where the first touch sensing data of the ADC ADCa indicates that the touch event has occurred, and in the case where the touch event also occurs on the at least one second adjacent sensing electrode, the processing circuit 123 may determine that the touch event occurs on the second current electrode selected by the routing circuit 122. Conversely, in the case where the first touch sensing data of the ADC ADCa indicates that the touch event has occurred, and in the case where the touch event does not occur on the at least one second adjacent sensing electrode, the processing circuit 123 may determine that the touch event does not occur on the second current electrode selected by the routing circuit 122.

Please refer to the first touch sensing data of the ADC ADCa for related descriptions regarding the second touch sensing data of the ADC ADCb. In the case where the second touch sensing data of the ADC ADCb indicates that the touch event has occurred, the processing circuit 123 may check whether the touch event also occurs on at least one third adjacent sensing electrode of the first sensing electrodes in the sub-region 111 adjacent to the third current electrode selected by the routing circuit 121 in the space, thereby determining whether the touch event also occurs on the third current electrode; and (or), the processing circuit 123 may check whether the touch event also occurs on at least one fourth adjacent sensing electrode of the second sensing electrodes in the sub-region 112 adjacent to the fourth current electrode selected by the routing circuit 122 in the space, thereby determining whether the touch event also occurs on the fourth current electrode.

Figure 3:
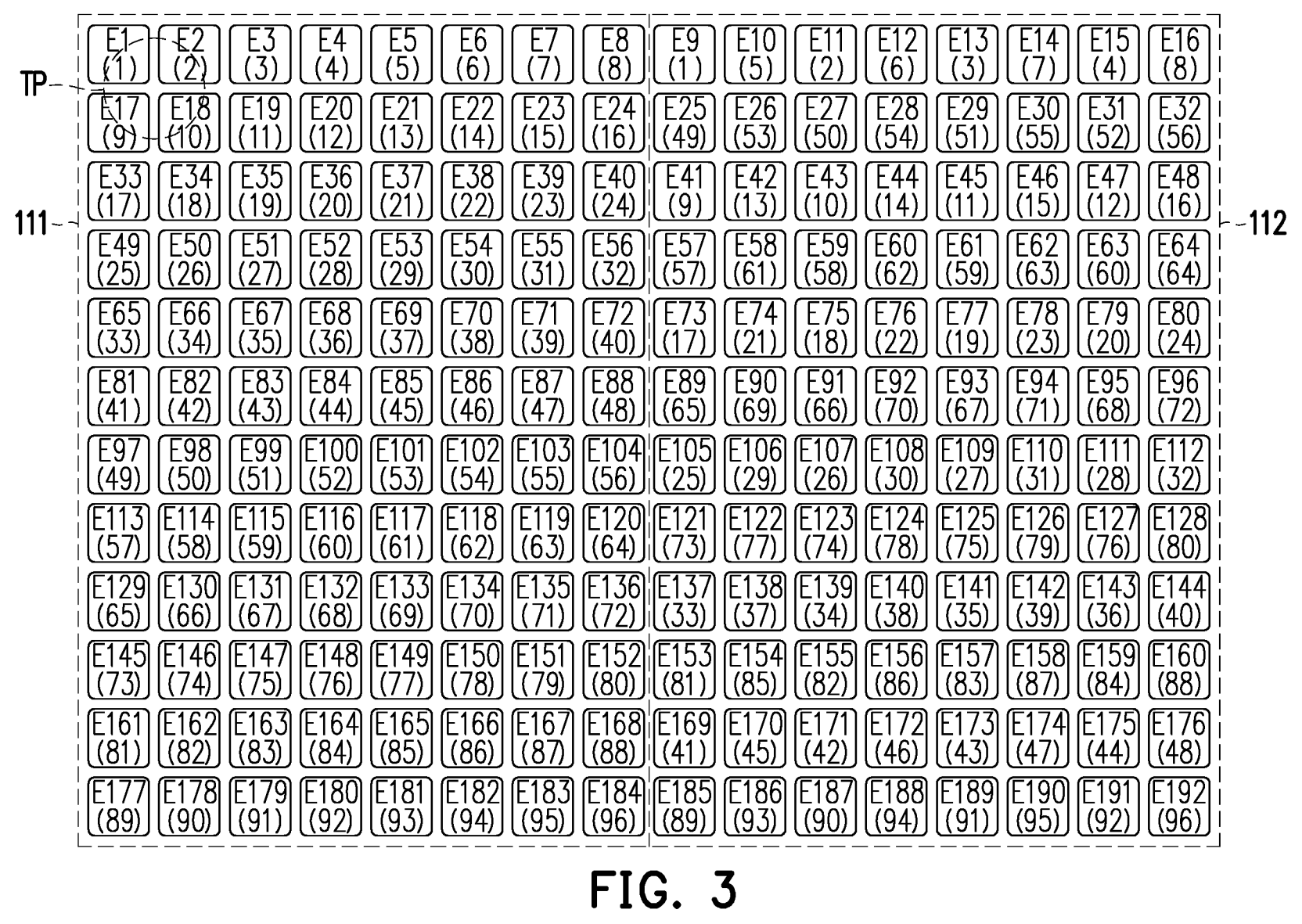

FIG. 3 is a schematic view illustrating the layout of a sensing electrode array of the touch panel 110 shown in FIG. 1 according to an embodiment of the present disclosure. Assume that the touch panel 110 shown in FIG. 3 has 192 sensing electrodes E1 to E192. In the case where the touch panel 110 is an in-cell touch display panel, the sub-electrodes E1 to E192 may be utilized common voltage electrodes of the in-cell touch display panel. In the embodiment shown in FIG. 3, the touch panel 110 is divided into a sub-region 111 and a sub-region 112. The sub-region 111 includes sensing electrodes E1 to E8, sensing electrodes E17 to E24, sensing electrodes E33 to E40, sensing electrodes E49 to E56, sensing electrodes E65 to E72, sensing electrodes E81 to E88, sensing electrodes E97 to E104, sensing electrodes E113 to E120, sensing electrodes E129 to E136, sensing electrodes E145 to E152, sensing electrodes E161 to E168, and sensing electrodes E177 to E184. The sub-region 112 includes sensing electrodes E9 to E16, sensing electrodes E25 to E32, sensing electrodes E41 to E48, sensing electrodes E57 to E64, sensing electrodes E73 to E80, sensing electrodes E89 to E96, sensing electrodes E105 to E112, sensing electrodes E121 to E128, sensing electrodes E137 to E144, sensing electrodes E153 to E160, sensing electrodes E169 to E176, and sensing electrodes E185 to E192.

Please refer to FIG. 1 to FIG. 3. The routing circuit 121 is configured to select one of the sensing electrodes E1 to E8, E17 to E24, E33 to E40, E49 to E56, E65 to E72, E81 to E88, E97 to E104, E113 to E120, E129 to E136, E145 to E152, E161 to E168 and E177 to E184 in the sub-region 111 in the first order as the first current electrode, and selectively connects the first current electrode to the common terminal TC1a of the routing circuit 121 (step S210). In the sub-region 111 shown in FIG. 3, the numbers in parentheses represent an example of the first order. The routing circuit 122 is configured to select one of the sensing electrodes E9 to E16, E25 to E32, E41 to E48, E57 to E64, E73 to E80, E89 to E96, E105 to E112, E121 to E128, E137 to E144, E153 to E160, E169 to E176, and E185 to E192 in the sub-region 112 in the second order (different from the first order) as the second current electrode, and selectively connects the second current electrode to the common terminal TC2a of the routing circuit 121 (step S220). In the sub-region 112 shown in FIG. 3, the numbers in parentheses represent an example of the second order.

Assume that the processing circuit 123 has only one ADC ADCa, then the ADC ADCa needs to perform 96 times of reading operations (converting operations). For example, during the first period, the ADC ADCa can perform a reading operation on the sensing electrode E1 and the sensing electrode E9. During the second period, the ADC ADCa can perform a reading operation on the sensing electrode E2 and the sensing electrode E11. During the third period, the ADC ADCa can perform a reading operation on the sensing electrode E3 and the sensing electrode E13. By analogy, the ADC ADCa can perform a reading operation on the sensing electrode E97 and the sensing electrode E25 in the 49th period, and perform a reading operation on the sensing electrode E184 and the sensing electrode E192 in the 96th period.

Assume the processing circuit 123 has 8 ADCs, then the 8 ADCs need to perform 12 times of reading operations (converting operations). For example, during the first period, the 8 ADCs can perform a reading operation on the sensing electrodes [E1 and E9], [E2 and E11], [E3 and E13], [E4 and E15], [E5 and E10], [E6 and E12], [E7 and E14] and [E8 and E16] respectively. During the second period, the 8 ADCs can perform a reading operation on the sensing electrodes [E17 and E41], [E18 and E43], [E19 and E45], [E20 and E47], [E21 and E42], [E22 and E44], [E23 and E46] and [E24 and E48] respectively. By analogy, the ADC ADCa can perform a reading operation on the sensing electrodes [E177 and E185], [E178 and E187], [E179 and E189], [E180 and E191], [E181 and E186], [E182 and E188], [E183 and E190] and [E184 and E192] respectively during the 12th period.

Assume that an object TP (such as a finger) touches the touch panel 110, and the touch position and touch range of the object TP are shown in FIG. 3. That is, the touch range of the object TP overlaps the sensing electrodes E1, E2, E17, and E18. Therefore, in one touch frame, the processing circuit 123 can know that a touch event occurs on at least one of the sensing electrodes E1 and E9 according to the touch sensing data corresponding to the sensing electrodes E1 and E9; the processing circuit 123 can know that a touch event occurs on at least one of the sensing electrodes E2 and E11 according to the touch sensing data corresponding to the sensing electrodes E2 and E11; the processing circuit 123 can know that a touch event occurs on at least one of the sensing electrodes E17 and E41 according to the touch sensing data corresponding to the sensing electrodes E17 and E41; the processing circuit 123 can know that a touch event occurs on at least one of the sensing electrodes E18 and E43 according to the touch sensing data corresponding to the sensing electrodes E18 and E43; and the processing circuit 123 can know that no touch event has occurred on the remaining sensing electrodes according to the touch sensing data corresponding to the remaining sensing electrodes.

Assume that the sensing electrode E1 is the first current electrode selected by the routing circuit 121 and the sensing electrode E9 is the second current electrode selected by the routing circuit 122. In the case where it is preliminarily determined that "a touch event occurs" on the sensing electrodes E1 and E9, the processing circuit 123 may check whether the touch event also occurs on at least one first adjacent sensing electrode (for example, the sensing electrodes E2, E17 and/or E18) adjacent to the sensing electrode E1, and (or) check whether the touch event also occurs on at least one second adjacent sensing electrode (for example, the sensing electrodes E10, E25 and/or E26) adjacent to the sensing electrode E9. Since the touch event also occurs on the sensing electrodes E2, E17 and/or E18 adjacent to the sensing electrode E1, the processing circuit 123 can further confirm that the touch event occurs on the first current electrode (sensing electrode E1). Since the touch event does not occur on the sensing electrodes E10, E25 and E26 adjacent to the sensing electrode E9, the processing circuit 123 can further confirm that the touch event does not occur on the second current electrode (sensing electrode E9).

Assume that the sensing electrode E1 is the first current electrode selected by the routing circuit 121 and the sensing electrode E11 is the second current electrode selected by the routing circuit 122. In the case where it is preliminarily determined that "a touch event occurs" on the sensing electrodes E2 and E11, the processing circuit 123 may check whether the touch event also occurs on at least one first adjacent sensing electrode (for example, the sensing electrodes E1, E3, E17, E18 and/or E19) adjacent to the sensing electrode E2, and (or) check whether the touch event also occurs on at least one second adjacent sensing electrode (for example, the sensing electrodes E10, E12, E26, E27 and/or E28) adjacent to the sensing electrode E11. Since the touch event also occurs on the sensing electrodes E1, E17 and/or E18 adjacent to the sensing electrode E2, the processing circuit 123 can further confirm that the touch event occurs on the first current electrode (sensing electrode E2). Since the touch event does not occur on the sensing electrodes E10, E12, E26, E27 and E28 adjacent to the sensing electrode E11, the processing circuit 123 can further confirm that the touch event does not occur on the second current electrode (sensing electrode E11).

Assume that the sensing electrode E17 is the first current electrode selected by the routing circuit 121 and the sensing electrode E41 is the second current electrode selected by the routing circuit 122. In the case where it is preliminarily determined that "a touch event occurs" on the sensing electrodes E17 and E41, the processing circuit 123 may check whether the touch event also occurs on at least one first adjacent sensing electrode (for example, the sensing electrodes E1, E2, E18, E33 and/or E34) adjacent to the sensing electrode E17, and (or) check whether the touch event also occurs on at least one second adjacent sensing electrode (for example, the sensing electrodes E24, E25, E26, E40, E42, E56, E57 and/or E58) adjacent to the sensing electrode E41. Since the touch event also occurs on the sensing electrodes E1, E2 and/or E18 adjacent to the sensing electrode E17, the processing circuit 123 can further confirm that the touch event occurs on the first current electrode (sensing electrode E17). Since the touch event does not occur on the sensing electrodes E24, E25, E26, E40, E42, E56, E57 and E58 adjacent to the sensing electrode E41, the processing circuit 123 can further confirm that the touch event does not occur on the second current electrode (sensing electrode E41).

Assume that the sensing electrode E18 is the first current electrode selected by the routing circuit 121 and the sensing electrode E43 is the second current electrode selected by the routing circuit 122. In the case where it is preliminarily determined that "a touch event occurs" on the sensing electrodes E18 and E43, the processing circuit 123 may check whether the touch event also occurs on at least one first adjacent sensing electrode (for example, the sensing E1, E2, E3, E17, E19, E33, E34 and/or E35) adjacent to the sensing electrode E18, and (or) check whether the touch event also occurs on at least one second adjacent sensing electrode (for example, the sensing electrodes E26, E27, E28, E42, E44, E58, E59 and/or E60) adjacent to the sensing electrode E43. Since the touch event also occurs on the sensing electrodes E1, E2 and/or E17 adjacent to the sensing electrode E18, the processing circuit 123 can further confirm that the touch event occurs on the first current electrode (sensing electrode E18). Since the touch event does not occur on the sensing electrodes E26, E27, E28, E42, E44, E58, E59 and E60 adjacent to the sensing electrode E43, the processing circuit 123 can further confirm that the touch event does not occur on the second current electrode (sensing electrode E43).

According to different requirement of design, the blocks of the routing circuit 121, the routing circuit 122 and/or the processing circuit 123 may be implemented in the form of hardware, firmware, software (i.e., program) or a combination of many of the three mentioned above.

In the form of hardware, the blocks of the routing circuit 121, the routing circuit 122 and/or the processing circuit 123 may be implemented in a logic circuit on an integrated circuit. The related functions of the routing circuit 121, the routing circuit 122 and/or the processing circuit 123 may be implemented as hardware by utilizing hardware description languages (such as Verilog HDL or VHDL) or other suitable programming languages. For example, the related functions of the routing circuit 121, the routing circuit 122 and/or the processing circuit 123 may be implemented in one or more controllers, microcontrollers, microprocessors, applications-specific integrated circuit (ASIC), digital signal processor (DSP), field programmable gate array (FPGA), and/or various logic blocks, modules, and circuits in other processing units.

In the form of software and/or firmware, the related functions of the routing circuit 121, the routing circuit 122 and/or the processing circuit 123 can be implemented as programming codes. For example, the routing circuit 121, the routing circuit 122 and/or the processing circuit 123 may be implemented by using general programming languages (such as C, C++, or a combination language) or other suitable programming languages. The programming codes may be recorded/stored in a recording medium, and the recording medium includes, for example, a read only memory (ROM), a storage device and/or a random access memory (RAM). A computer, a central processing unit (CPU), a controller, a microcontroller, or a microprocessor can read from the recording medium and execute the programming codes to achieve related functions. As the recording medium, a "non-transitory computer readable medium", such as a tape, a disk, a card, a semiconductor memory, programmable logic circuits, etc., may be utilized. In addition, the program may be provided to the computer (or CPU) through any transmission medium (communication network, radio wave, etc.). The communication network is, for example, the Internet, wired communication, wireless communication, or other communication media.

In summary, the touch apparatus 100 and the touch driving device 120 and the operation method thereof described in the embodiments of the disclosure can divide the touch panel 110 into two or more sub-regions (such as a sub-region 111 and a sub-region 112). In a reading operation performed by the processing circuit 123 on the touch panel 110, the routing circuit 121 can select a sensing electrode (first current electrode) from the sub-region 111 in the "first order", and the routing circuit 122 can select a sensing electrode (second current electrode) from the sub-region 112 in the "second order" (different from the first order). The routing circuit 121 and the routing circuit 122 make the first current electrode and the second current electrode to be short-circuited (electrically connected) with each other. In the meantime (in a reading operation performed by the processing circuit 123 on the touch panel 110), the same ADC (e.g., ADCa) in the processing circuit 123 can obtain (read) the touch sensing result corresponding to the first current electrode and the second current electrode through the routing circuit 121 and the routing circuit 122, then convert the touch sensing result into the touch sensing data. Therefore, in the case where the number of ADCs is limited, the touch driving device 120 can reduce the frequency of reading operation on the touch panel 110 (or reduce the number of ADCs in the case where the frequency of reading operation on the touch panel 110 is limited).

Although the present disclosure has been disclosed in the above embodiments, it is not intended to limit the present disclosure, and those skilled in the art can make some modifications and refinements without departing from the spirit and scope of the disclosure. Therefore, the scope of the present disclosure is subject to the definition of the scope of the appended claims.

What is claimed is:

1. A touch driving device adapted to drive a touch panel, the touch driving device comprising:
   a first routing circuit, having a plurality of first selection terminals adapted to be coupled to a plurality of first sensing electrodes in a first sub-region of the touch panel, and configured to select one of the plurality of first sensing electrodes in a first order as a first current electrode, and selectively connecting the first current electrode to a first common terminal of the first routing circuit;
   a second routing circuit having a plurality of second selection terminals adapted to be coupled to a plurality of second sensing electrodes in a second sub-region of the touch panel, and configured to select one of the plurality of second sensing electrodes in a second order different from the first order as a second current electrode, and selectively connecting the second current electrode to a second common terminal of the second routing circuit, wherein the second common terminal is coupled to the first common terminal; and
   a processing circuit having a first input terminal coupled to the first common terminal and the second common terminal, wherein,
   a first analog-to-digital converter (ADC) of the processing circuit converts a first touch sensing result corresponding to the first input terminal into a first touch sensing data; and
   in the case where the first touch sensing data indicates that a touch event has occurred, the processing circuit checks whether the touch event also occurs on at least one first adjacent sensing electrode of the plurality of first sensing electrodes adjacent to the first current electrode in a space to determine whether the touch event occurs on the first current electrode.

2. The touch driving device of claim 1, wherein
   in the case where the first touch sensing data indicates that the touch event has occurred, and in the case where the touch event also occurs on the at least one first adjacent sensing electrode, the processing circuit determines that the touch event occurs on the first current electrode; and
   in the case where the first touch sensing data indicates that the touch event has occurred, and in the case where the touch event does not occur on the at least one first adjacent sensing electrode, the processing circuit determines that the touch event does not occur on the first current electrode.

3. The touch driving device of claim 2, wherein
   in the case where the first touch sensing data indicates that the touch event has occurred, and in the case where it is determined that the touch event does not occur on the first current electrode, the processing circuit determines that the touch event occurs on the second current electrode.

4. The touch driving device of claim 1, wherein in the case where the first touch sensing data indicates that the touch event has occurred, the processing circuit further checks whether the touch event also occurs on at least one second adjacent sensing electrode of the plurality of second sensing electrodes adjacent to the second current electrode in the space, thereby determining whether the touch event occurs on the second current electrode.

5. The touch driving device of claim 4, wherein
   in the case where the first touch sensing data indicates that the touch event has occurred, and in the case where the touch event also occurs on the at least one second adjacent sensing electrode, the processing circuit determines that the touch event occurs on the second current electrode; and
   in the case where the first touch sensing data indicates that the touch event has occurred, and in the case where the touch event does not occur on the at least one second adjacent sensing electrode, the processing circuit determines that the touch event does not occur on the second current electrode.

6. The touch driving device of claim 1, wherein
   the first routing circuit selects another one of the plurality of first sensing electrodes in the first order as a third current electrode, and selectively connects the third current electrode to a third common terminal of the first routing circuit;
   the second routing circuit selects another one of the plurality of second sensing electrodes in the second order as a fourth current electrode, and selectively connects the fourth current electrode to a fourth common terminal of the second routing circuit, wherein the fourth common terminal is coupled to the third common terminal;
   a second input terminal of the processing circuit is coupled to the third common terminal and the fourth common terminal;
   a second ADC of the processing circuit converts a second touch sensing result corresponding to the second input terminal into a second touch sensing data; and
   in the case where the second touch sensing data indicates that the touch event has occurred, the processing circuit checks whether the touch event also occurs on at least one third adjacent sensing electrode of the plurality of first sensing electrodes adjacent to the third current electrode in the space, thereby determining whether the touch event occurs on the third current electrode, or the processing circuit checks whether the touch event also occurs on at least one fourth adjacent sensing electrode of the plurality of second sensing electrodes adjacent to the fourth current electrode in the space, thereby determining whether the touch event occurs on the fourth current electrode.

7. The touch driving device of claim 1, wherein the touch panel is an in-cell touch display panel, and the plurality of first sensing electrodes and the plurality of second sensing electrodes are utilized as a common voltage electrode of the in-cell touch display panel.

8. An operation method of touch driving device, the touch driving device adapted to drive a touch panel, the operation method comprising:
   selecting, by a first routing circuit in a first order, one of a plurality of first sensing electrodes in a first sub-region of the touch panel as a first current electrode, and selectively connecting the first current electrode to a first common terminal of the first routing circuit;
   selecting, by a second routing circuit in a second order different from the first order, one of a plurality of second sensing electrodes in a second sub-region of the touch panel as a second current electrode, and selectively connecting the second current electrode to a second common terminal of the second routing circuit, wherein the second common terminal and the first common terminal are commonly coupled to a first input terminal of a processing circuit;

converting, by a first ADC of the processing circuit, a first touch sensing result corresponding to the first input terminal into a first touch sensing data; and in the case where the first touch sensing data indicates that a touch event has occurred, checking, by the processing circuit, whether the touch event also occurs on at least one first adjacent sensing electrode of the plurality of first sensing electrodes adjacent to the first current electrode in a space to determine whether the touch event occurs on the first current electrode.

9. The operation method of claim 8, further comprising:
in the case where the first touch sensing data indicates that the touch event has occurred, and in the case where the touch event also occurs on the at least one first adjacent sensing electrode, determining that the touch event occurs on the first current electrode; and
in the case where the first touch sensing data indicates that the touch event has occurred, and in the case where the touch event does not occur on the at least one first adjacent sensing electrode, determining that the touch event does not occur on the first current electrode.

10. The operation method of claim 9, further comprising:
in the case where the first touch sensing data indicates that the touch event has occurred, and in the case where it is determined that the touch event does not occur on the first current electrode, determining that the touch event occurs on the second current electrode.

11. The operation method of claim 8, further comprising:
in the case where the first touch sensing data indicates that the touch event has occurred, checking, by the processing circuit, whether the touch event also occurs on at least one second adjacent sensing electrode of the plurality of second sensing electrodes adjacent to the second current electrode in the space to determine whether the touch event occurs on the second current electrode.

12. The operation method of claim 11, further comprising:
in the case where the first touch sensing data indicates that the touch event has occurred, and in the case where the touch event also occurs on the at least one second adjacent sensing electrode, determining that the touch event occurs on the second current electrode; and
in the case where the first touch sensing data indicates that the touch event has occurred, and in the case where the touch event does not occur on the at least one second adjacent sensing electrode, determining that the touch event does not occur on the second current electrode.

13. The operation method of claim 8, further comprising:
selecting, by the first routing circuit in the first order, another one of the plurality of first sensing electrodes as a third current electrode, and selectively connecting the third current electrode to a third common terminal of the first routing circuit;
selecting, by the second routing circuit in the second order, another one of the plurality of second sensing electrodes as a fourth current electrode, and selectively connecting the fourth current electrode to a fourth common terminal of the second routing circuit, wherein the fourth common terminal and the third common terminal are commonly coupled to a second input terminal of the processing circuit;

converting, by a second ADC of the processing circuit, a second touch sensing result corresponding to the second input terminal into a second touch sensing data; and in the case where the second touch sensing data indicates that the touch event has occurred, checking, by the processing circuit, whether the touch event also occurs on at least one third adjacent sensing electrode of the plurality of first sensing electrodes adjacent to the third current electrode in the space to determine whether the touch event occurs on the third current electrode, or checking, by the processing circuit, whether the touch event also occurs on at least one fourth adjacent sensing electrode of the plurality of second sensing electrodes adjacent to the fourth current electrode in the space to determine whether the touch event occurs on the fourth current electrode.

14. The operation method of claim 8, wherein the touch panel is an in-cell touch display panel, and the plurality of first sensing electrodes and the plurality of second sensing electrodes are utilized as a common voltage electrode of the in-cell touch display panel.

15. A touch apparatus, comprising:
a touch panel;
a first routing circuit having a plurality of first selection terminals coupled to a plurality of first sensing electrodes in a first sub-region of the touch panel, and configured to select one of the plurality of first sensing electrodes in a first order as a first current electrode, and selectively connecting the first current electrode to a first common terminal of the first routing circuit;
a second routing circuit having a plurality of second selection terminals coupled to a plurality of second sensing electrodes in a second sub-region of the touch panel, and configured to select one of the plurality of second sensing electrodes in a second order different from the first order as a second current electrode, and selectively connecting the second current electrode to a second common terminal of the second routing circuit, wherein the second common terminal is coupled to the first common terminal; and
a processing circuit having a first input terminal coupled to the first common terminal and the second common terminal, wherein,
a first ADC of the processing circuit converts a first touch sensing result corresponding to the first input terminal into a first touch sensing data; and
in the case where the first touch sensing data indicates that a touch event has occurred, the processing circuit checks whether the touch event also occurs on at least one first adjacent sensing electrode of the plurality of first sensing electrodes adjacent to the first current electrode in a space to determine whether the touch event occurs on the first current electrode.

16. The touch apparatus of claim 15, wherein
in the case where the first touch sensing data indicates that the touch event has occurred, and in the case where the touch event also occurs on the at least one first adjacent sensing electrode, the processing circuit determines that the touch event occurs on the first current electrode; and
in the case where the first touch sensing data indicates that the touch event has occurred, and in the case where the touch event does not occur on the at least one first adjacent sensing electrode, the processing circuit determines that the touch event does not occur on the first current electrode.

17. The touch apparatus of claim 16, wherein
in the case where the first touch sensing data indicates that the touch event has occurred, and in the case where it is determined that the touch event does not occur on the first current electrode, the processing circuit determines that the touch event occurs on the second current electrode.

18. The touch apparatus of claim 15, wherein in the case where the first touch sensing data indicates that the touch event has occurred, the processing circuit further checks whether the touch event also occurs on at least one second adjacent sensing electrode of the plurality of second sensing electrodes adjacent to the second current electrode in the space, thereby determining whether the touch event occurs on the second current electrode.

19. The touch apparatus of claim 18, wherein
in the case where the first touch sensing data indicates that the touch event has occurred, and in the case where the touch event also occurs on the at least one second adjacent sensing electrode, the processing circuit determines that the touch event occurs on the second current electrode; and
in the case where the first touch sensing data indicates that the touch event has occurred, and in the case where the touch event does not occur on the at least one second adjacent sensing electrode, the processing circuit determines that the touch event does not occur on the second current electrode.

20. The touch apparatus of claim 15, wherein
the first routing circuit selects another one of the plurality of first sensing electrodes in the first order as a third current electrode, and selectively connects the third current electrode to a third common terminal of the first routing circuit;
the second routing circuit selects another one of the plurality of second sensing electrodes in the second order as a fourth current electrode, and selectively connects the fourth current electrode to a fourth common terminal of the second routing circuit, wherein the fourth common terminal is coupled to the third common terminal;
a second input terminal of the processing circuit is coupled to the third common terminal and the fourth common terminal;
a second ADC of the processing circuit converts a second touch sensing result corresponding to the second input terminal into a second touch sensing data; and
in the case where the second touch sensing data indicates that the touch event has occurred, the processing circuit checks whether the touch event also occurs on at least one third adjacent sensing electrode of the plurality of first sensing electrodes adjacent to the third current electrode in the space, thereby determining whether the touch event occurs on the third current electrode, or the processing circuit checks whether the touch event also occurs on at least one fourth adjacent sensing electrode of the plurality of second sensing electrodes adjacent to the fourth current electrode in the space, thereby determining whether the touch event occurs on the fourth current electrode.

21. The touch apparatus of claim 15, wherein the touch panel is an in-cell touch display panel, and the plurality of first sensing electrodes and the plurality of second sensing electrodes are utilized as a common voltage electrode of the in-cell touch display panel.

\* \* \* \* \*